Feb. 22, 1966 P. G. FORET 3,236,468

TAPE CARTRIDGE

Filed March 11, 1963

INVENTOR.
Pierre G. Foret

BY

Hovey, Schmidt, Johnson & Hovey
ATTORNEYS.

United States Patent Office 3,236,468

Patented Feb. 22, 1966

3,236,468

TAPE CARTRIDGE

Pierre G. Foret, Tulsa, Okla., assignor to Midwestern Instruments, Inc., Tulsa, Okla., a corporation of Oklahoma Filed Mar. 11, 1963, Ser. No. 264,087
12 Claims. (Cl. 242—55.13)

This invention relates to tape cartridges for magnetic tape recorders and, more specifically, to cartridges for utilization with the magazines of tape transports.

It is an object of this invention to provide a tape cartridge for facilitating the loading and unloading of the tape-receiving magazine of a tape transport.

It is another object of this invention to provide such a cartridge that will positively prevent unreeling of the tapes from their respective reels when in nonuse.

It is another object of this invention to provide an improved means for securing tape reels to the drive mechanism of tape recorders, such means employing a partial vacuum to releasably secure the reels to their respective rotatable spindles of the tape drive mechanism.

It is still another object of this invention to provide such a releasable securing means as set forth in the last-mentioned object cooperative with a fixed support for engaging the reels upon removal thereof from the drive spindles.

It is yet another object of this invention to provide a cartridge for enclosing the reels when in nonuse, such cartridge having a removable closure plate and a fastener adapted to secure the reels to the tape recorder or transport when the closure plate is removed to thereby place the reels in engagement with corresponding spindles, the reels at all times prior to engagement with the spindles being rigidly held to prevent inadvertent unreeling of the tapes therefrom.

Other objects will become apparent as the detailed description proceeds.

Figure 1:
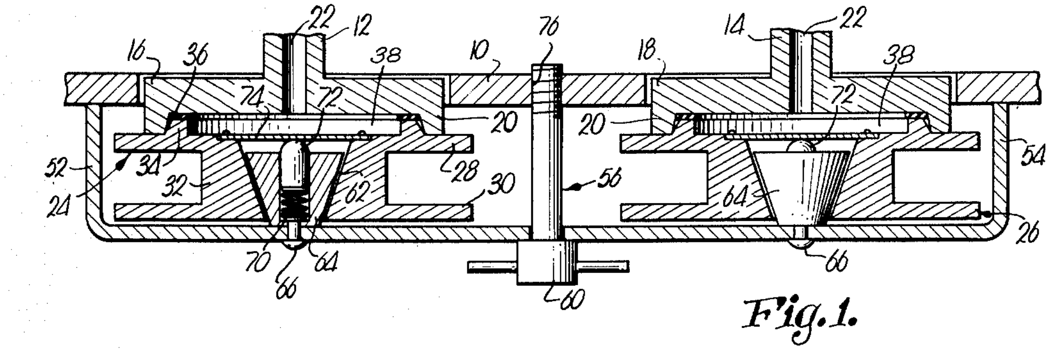
FIGURE 1 is a horizontal sectional view showing the cartdige and reels mounted on a tape transport with the reels in engagement with corresponding spindles.

In FIG. 1 the front panel or wall of the cabinet of a tape transport is illustrated at 10. A pair of rotatable supports or spindles 12 and 14 are shown extending through apertures in wall 10 presenting faceplates 16 and 18, respectively. Each faceplate is provided with an annular rib 20. Each spindle contains a suction duct 22 which communicates the faceplate with means for maintaining a negative air pressure in the duct.

It may be appreciated at this juncture that spindles 12 and 14 receive the storage reel and the take-up reel and rotate the reels about their axes during operation of the tape transport. The spindles are thus coupled to appropriate drive mechanisms (not shown) for effecting this function in the well-known and conventional manner common to all tape recorders.

It should be noted that the spindles 12 and 14 differ from the usual tape recorder or tape transport spindles in that each is provided with an annular rib 20 and a suction duct 22. This construction permits faceplates 16 and 18 to engage web-receiving or tape reels 24 and 26, respectively. Each of the reels comprises a pair of discs 28 and 30 and a hub 32 formed as an integral unit. An annular rib 34 projects outwardly from disc 28 and telescopes within annular rib 20. An O-ring 36 is disposed on each of the faceplates adjacent the annular rib 20. As is clearly shown in FIG. 1, the annular rib 34 of each reel engages the corresponding O-ring 36 and thus a tight seal is formed without the mating ribs 20 and 34 being machined to high tolerances. Therefore a negative pressure in suction ducts 22 secures the reels on the faceplates due to the partial vacuum created in the cavity 38 between each reel and the corresponding faceplate.

Figure 2:
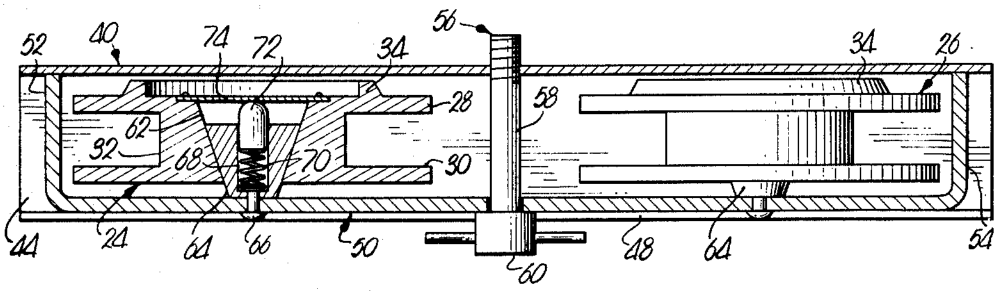
FIG. 2 is a horizontal sectional view showing the reels in their cartridge with the closure plate of the cartridge in place.
Figure 3:
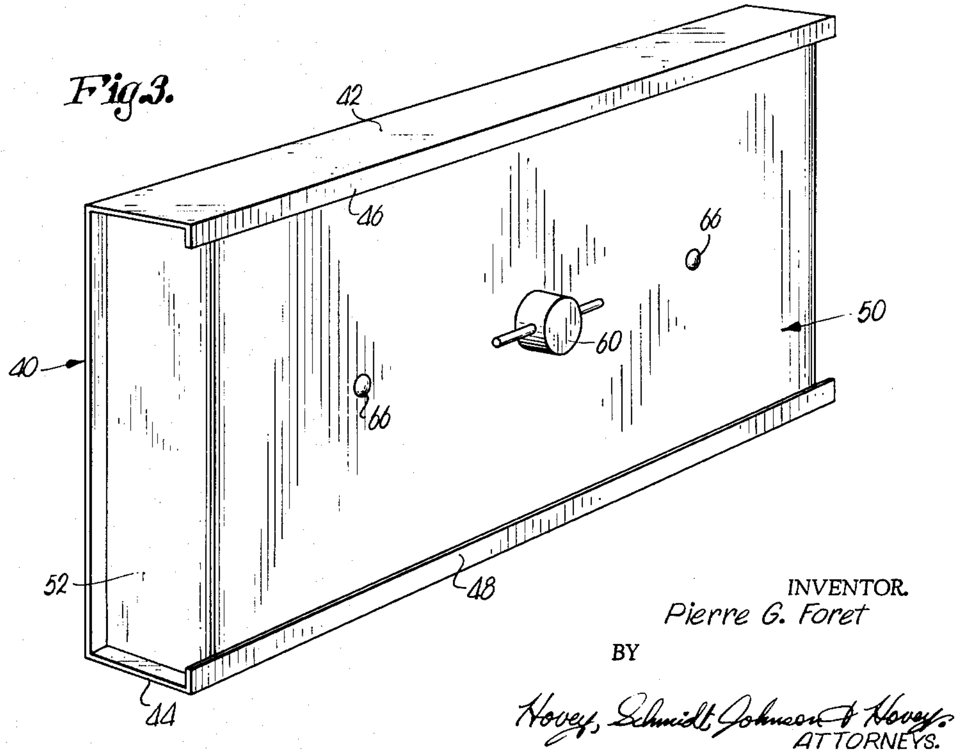
FIG 3 is a perspective view of the cartridge.

Referring now to FIGS. 2 and 3, the reels 24 and 26 are shown stored in their cartridge during nonuse. The cartridge comprises a closure plate 40 having a laterally extending top and bottom 42 and 44, respectively. A flange 46 extends downwardly from the front edge of the top 42, and a flange 48 extends upwardly from the front edge of the bottom 44. The closure plate 40 thus slidably receives panel 50 having ends 52 and 54 as is clearly revealed by FIGS. 2 and 3. A fastener 56 comprising a bolt 58 and a head 60 adapted for manual operation of the bolt is utilized to secure the panel 50 to the closure plate 40. The bolt 58 extends through an aperture in panel 50 and the external threads thereof are received by a mating opening in closure plate 40.

The hub 32 of each of the reels contains a frusto-conical bore 62 through the center thereof. A fixed support or plug 64 having a configuration complemental to the bore 62 is disposed within the bore in engagement therewith. Plug 64, therefore, takes the form of a truncated, solid cone, the end of the cone opposite the base thereof being secured to panel 50 by means of a rivet 66. The height of the cone (axial length of the plug 64) is less than the axial length of bore 62. Each plug 64 is provided with a socket 68. Within the socket 68 is a spring 70 which engages the base of socket 68 and a bullet-shaped button 72.

A cover member 74 is received by a recess in the disc portion 28 of each reel, the cover 74 being disposed to close the end of the bore 62 remote from panel 50. Machine screws or the like may be utilized to secure the cover to the corresponding disc. It is important that the cover 74 seal the bore 62 from the cavity 38 formed by each reel when it is placed in engagement with the respective spindle.

The action of spring 70 forces the tip of button 72 into engagement with cover 74 to thereby yieldably secure the reel to the plug due to the mating of the corresponding frusto-conical surfaces. It is noteworthy that this construction does not require that the engaging frusto-conical surfaces be precisely machined because the force of the button 72 against the cover 74 under the action of spring 70 assures that the reel will be secured to the plug. Thus, it may be appreciated that in FIG. 2, the storage and take-up reels are maintained in their cartridge for future use without the danger of the storage reel slipping and unreeling its tape during handling of the cartridge.

When it is desired to load the reels on the tape transport the cartridge becomes a tape magazine for the transport and facilitates the rapid placing of the apparatus in condition for operation. The closure plate 40 is removed by disengaging fastener 56 therefrom. The threaded end of bolt 58 is then brought into alignment with a threaded opening 76 in wall 10 and the bolt turned to engage the mating threads. The bolt is disposed intermediate the reels and the opening 76 is placed in the wall 10 to mate with the bolt to properly place the reels in alignment with their corresponding faceplates. As the bolt 58 advances into opening 76 by the manual rotation of head 60, ribs 20 and 34 telescope one within the other as shown in FIG. 1. As the O-ring 36 of each faceplate is compressed, a seal is formed and the negative pressure in ducts 22 secures the reels to the faceplates. Further advancement of the bolt 58 compresses springs 70 from the position shown in FIG. 2 to the position shown in FIG. 1. It may be appreciated by viewing FIG. 1 that this compression is caused by the buttons 72 being forced against corresponding cover members 74 during advancement of bolt 58. The panel 50 is thus advanced until its ends 52 and 54 contact wall 10 to secure the magazine to the transport. Therefore, the mating frusto-conical surfaces of the plugs 64 and respective bores 62 are forced out of engagement thereby freeing the reels for rotation by spindles 12 and 14.

After operation of the transport, the negative pressure is removed from ducts 22 and the fastener 56 is unscrewed to again place the frusto-conical surfaces of the plugs and bores in engagement. Fastener 56 may then be completely loosened and the panel 50 removed from the transport without danger of the reels slipping.

Having thus described the invention, what is claimed as new and desired to be secured by Letters Patent is:

1. In combination with a web-receiving reel:
- a rotatable support for the reel having a faceplate for engagement with the reel, said reel and said faceplate having relatively telescoped, continuous ribs presenting a cavity between the faceplate and the reel, said rotatable support having a suction duct communicating with the cavity for holding a partial vacuum in the latter to maintain the reel on the faceplate when there is a negative pressure in said duct, the reel having a hub provided with a bore;
- a fixed support disposed within said bore for engagement with the hub surrounding the bore; and
- means for moving the reel onto the fixed support when the reel is removed from the rotatable support.

2. The invention of claim 1, said moving means including means normally biasing the hub surrounding the bore of said reel in engagement with said fixed support.

3. In a cartridge of the kind described:
- a panel; and
- a pair of spaced, web-receiving reels, each having:
  - a hub provided with a bore,
  - a plug in the bore having a socket,
  - means attaching the plug to the panel,
  - resilient means in the socket, and
  - means rigid with the reel and engaged by the resilient means for yieldably holding the hub in engagement with the plug under influence of said resilient means.

4. The invention of claim 3, said bore being frusto-conical and said plug having a configuration complemental to said bore.

5. The invention of claim 3, said plug comprising a truncated, solid cone, said attaching means rigidly securing the end of the cone opposite the base thereof to the panel, said bore having a configuration complemental to said cone.

6. In combination with a magnetic tape recorder having a pair of rotatable spindles each provided with a suction duct and a faceplate:
- a panel having a fastener for securing the panel to the recorder;
- a pair of tape reels each provided with a frusto-conical bore and a plug in the bore thereof having a configuration complemental to the bore;
- means attaching the plugs to the panel; and
- resilient means for each reel respectively yieldably holding the same in engagement with its plug, said reels engaging corresponding faceplates with the reels held out of engagement with their plugs against the action of said resilient means when the panel is secured to the recorder, there being a cavity between each reel and its faceplate communicating with the corresponding duct for holding a partial vacuum therein to maintain the reels on the faceplates for rotation therewith when there is a negative pressure in the ducts.

7. The invention of claim 6, a cover member attached to each reel closing the end of its bore remote from the panel, each plug having a socket, said resilient means for each reel being disposed in the socket of the corresponding plug and in engagement therewith and with the corresponding cover member.

8. In combination with a magnetic tape recorder having a pair of rotatable spindles each provided with a suction duct and a faceplate:
- a cartridge having a closure plate and a fastener holding the closure plate in place;
- a pair of tape reels in the cartridge, each provided with a frusto-conical bore and a plug in the bore thereof having a configuration complemental to the bore;
- means attaching the plugs to the cartridge;
- resilient means for each reel respectively yieldably holding the same in engagement with its plug; and
- means utilizing said fastener for securing the cartridge to the recorder after removal of said closure plate, said reels engaging corresponding faceplates with the reels held out of engagement with their plugs against the action of said resilient means when the cartridge is secured to the recorder, there being a cavity between each reel and its faceplate communicating with the corresponding duct for holding a partial vacuum therein to maintain the reels on the faceplates for rotation therewith when there is a negative pressure in the ducts.

9. The invention of claim 8, said means for securing the cartridge to the recorder comprising mounting means on said recorder for receiving said fastener.

10. The invention of claim 8, a cover member attached to each reel closing the end of its bore adjacent said closure plate, each plug having a socket, said resilient means for each reel being disposed in the socket of the corresponding plug and in engagement therewith and with the corresponding cover member.

11. In a cartridge of the kind described:
- a panel; and
- a pair of spaced, web-receiving reels, each having:
  - a hub provided with a bore;
  - a truncated, conical plug in the bore having a socket, said bore having a configuration complemental to said plug, the latter having a height less than the axial length of said bore;
  - means rigidly securing the end of the plug opposite the base thereof to the panel;
  - resilient means in the socket; and
  - a cover member attached to the hub closing the end of the bore adjacent the base of said plug, said member being engaged by said resilient means to yieldably hold the hub in engagement with the plug.

12. In combination with a web-receiving reel;
- a rotatable support for the reel having a faceplate for engagement with the reel, there being a cavity between the faceplate and the reel, said rotatable support having a suction duct communicating with the cavity for holding a partial vacuum in the latter to maintain the reel on the faceplate when there is a negative pressure in said duct, the reel having a hub provided with a bore;
- a fixed support disposed within said bore for engagement with the hub surrounding the bore; and
- means for moving the reel onto the fixed support when the reel is removed from the rotatable support.

References Cited by the Examiner

UNITED STATES PATENTS

| | | | |
|---|---|---|---|
| 2,941,739 | 6/1960 | Burke et al. | 242—55.13 X |
| 2,998,206 | 8/1961 | Pendleton | 242—68.1 |

MERVIN STEIN, *Primary Examiner.*